Patented June 28, 1949

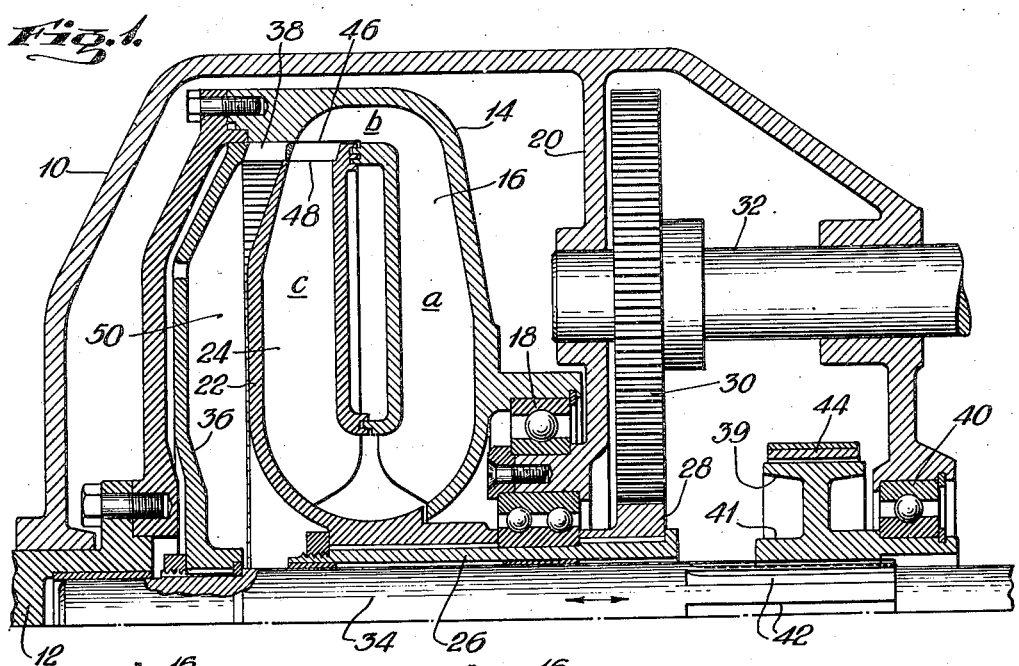
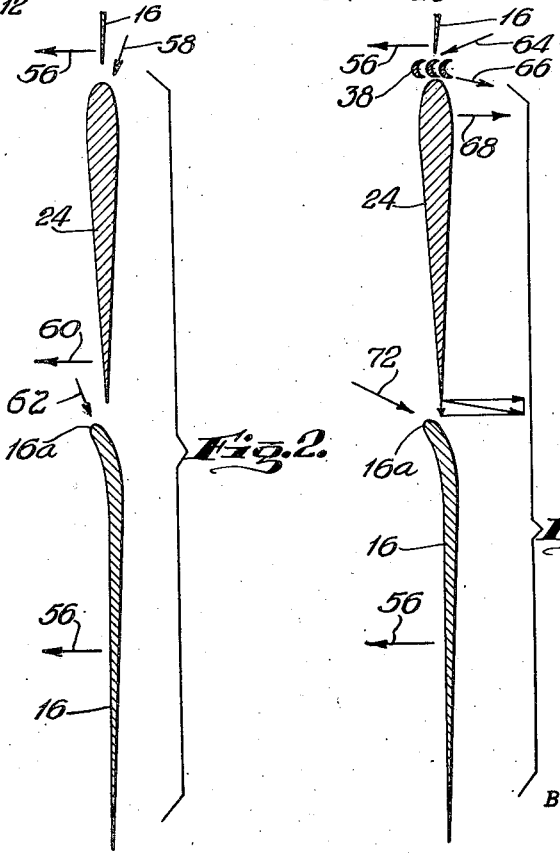
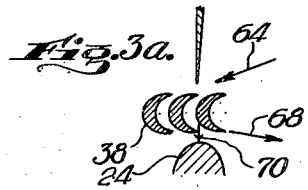
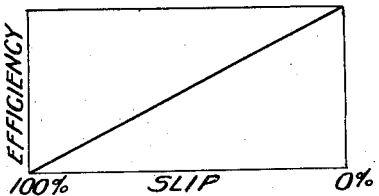
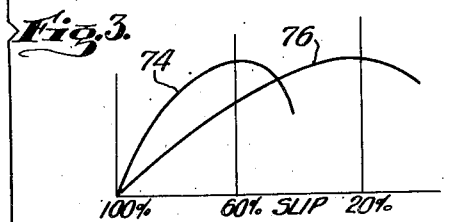

2,474,586

UNITED STATES PATENT OFFICE 2,474,586

REVERSIBLE HYDRAULIC COUPLING

Alf Lysholm, Stockholm, Sweden, assignor, by mesne assignments, to Jarvis C. Marble, New York, N. Y., Leslie M. Merrill, Westfield, N. J., and Percy H. Batten, Racine, Wis., as trustees Application August 25, 1943, Serial No. 500,007

5 Claims. (Cl. 60—54)

1

The present invention relates to hydraulic couplings of the closed circuit type and has particular reference to reversible couplings of this kind. Still more particularly the invention relates to reversible couplings having efficiency and torque transmitting characteristics particularly suitable for driving marine propellers, although it is to be understood that the invention is not limited to that particular use.

It has heretofore been proposed to provide reversible couplings of the general type under consideration in which the reversing function is accomplished by altering the blade arrangement in the hydraulic circuit but the arrangements heretofore proposed are not satisfactory from the standpoint of providing efficiency and torque transmitting characteristics which are adequate and satisfactory for the operation of a commercially acceptable installation.

The general object, therefore, of the present invention is to provide a new and improved form of reversible hydraulic coupling which is capable of providing torque transmitting and efficiency characteristics in forward drive that are substantially the same as if the coupling were of a one-way or irreversible type and which will also provide capacity and efficiency characteristics in reverse operation which will permit of a marine propeller or other driven element being operated under load in reverse at a speed that may be as high as of the order of 80% of forward speed.

In order to accomplish the above general object and other and more detailed objects, which will hereinafter be pointed out, the invention contemplates the novel form and arrangement of parts hereinafter more particularly described in the ensuing portion of this specification wherein, taken in conjunction with the accompanying drawings, there is disclosed by way of example, but without limitation, one suitable form of apparatus for carrying the invention into effect.

In the accompanying drawings,

Fig. 1 is a more or less diagrammatic half section of a coupling embodying the principles of the invention.

Fig. 2 is a developed diagram illustrative of the blading and of certain characteristics of flow in the fluid circuit when drive is forward, Fig. 3 is a similar diagram illustrating the flow characteristics when drive is reverse, Fig. 3a is a part of the structure shown in Fig. 3, on enlarged scale, Fig. 4 is a diagram illustrative of efficiency characteristics in forward drive, and

2

Fig. 5 is a diagram illustrative of efficiency characteristics in reverse.

Referring now more particularly to the drawings, 10 indicates a rotationally stationary housing in which the primary or power input shaft 12 is journaled. Attached to shaft 12 is a rotatable casing 14 which carries the primary or pump blades 16. Casing 14 is also supported by bearing 18 carried by a web 20 forming a part of the stationary housing.

The driven or secondary member 22 carrying turbine blades 24, is secured to a hollow driven shaft member or sleeve 26 carrying gear 28, which in the embodiment illustrated meshes with a reduction gear 30 secured to a tail shaft 32 which may be utilized for driving a marine propeller or other load.

A central shaft 34 is slidably journaled in the sleeve 26 and preferably also journaled in a socket in the input shaft 12. Shaft 34 is axially shiftable by any suitable control means (not illustrated) and carries a reversing blade wheel 36 upon which are mounted the reversing guide blades 38.

Externally of the coupling the shaft 34 is provided with means for selectively holding the shaft against rotation or permitting it to rotate freely. In the embodiment illustrated, this means is shown in the form of a brake drum 39, the hub 41 of which is rotatably carried by a combined radial and thrust bearing 40. Hub 41 is splined to engage corresponding splines 42 in shaft 34, the shaft splines being longer than the width of the hub to permit shaft 34 to be moved axially relative to the brake drum. The drum 39 is clamped against rotation or permitted to rotate by the action of a brake band 44, selectively actuated by any suitable control (not illustrated).

Referring again more particularly to the hydraulic circuit, it will be observed that the pump provides for substantially radially outward flow, in the portion $a$ of the circuit, the pump blades preferably being extended as shown to provide pump outlet edges 46 which discharge the liquid substantially radially inwardly, the radially outermost portion of the circuit $b$ where the flow is generally axial being included within the bladed portion of the pump member. The turbine blades provide the substantially radially inward flow section $c$, the inlet edges 48 of the turbine blades providing for substantially radially inward flow of the liquid to these blades.

As will be observed, the reversing blades 38 are shiftable into and out of the circuit by axial movement of the reversing member within the chamber 50 provided for the reception of this member between the wall of the turbine member 22 and the adjacent wall of the rotating casing 14.

Referring now more particularly to Figs. 2 and 3, the pump blades 16 are arranged substantially radially with their outlet edge portions shaped to provide substantially radial discharge. Preferably, for reasons hereinafter to be more fully explained, the profiles of the pump blades are shaped so as to provide inclined or cambered inlet or nose portions 16a which are inclined forwardly in the direction of rotation of the pump wheel.

The turbine blades 24 are also substantially radially arranged, and as shown in the figures both the pump blades and the turbine blades are preferably thickened toward their inlet sides to provide relatively blunt inlet edges, with the profile being of what may be said to be a streamlined or modified tear drop outline.

The profile of the reversing blades 38 is of characteristic impulse turbine blade design and as will be observed from the drawings, the reversing blades are pitched much more closely than either the pump or the turbine blades. Also, the reversing blades are shaped to provide very small outlet angles, usually less than 20° and preferably as small as 10° or even less.

If we now consider Fig. 2 and the flow action taking place when the device is in forward drive, it will be apparent that it operates as a pure two-element coupling, only the pump blades 16 and the turbine blades 24 being in the circuit. Assuming the pump blades to be rotating in the direction indicated by arrow 56 and the turbine blades to be operating forwardly under normal full speed conditions, that is, with a slip of perhaps 3%, the relative inlet angle of the liquid entering the turbine wheel will be as indicated by arrow 58. Under these same assumed conditions, with turbine blades 24 rotating in the direction indicated by arrow 60, the relative inlet angle of flow to the pump blades will be as indicated by arrow 62. From the above, it will be evident that under normal operating conditions the circulation of the liquid through the coupling will be substantially undeflected peripherally relative to the blading and the coupling will have essentially the characteristics of a one-way or irreversible coupling, the efficiency characteristic of which is as shown in Fig. 4, wherein the efficiency is a straight line function of the amount of slip.

If we now consider the condition with normal operation in reverse, the direction of the pump blades is again as indicated by the arrow 56, the relative inlet angle of flow of the liquid into the stationary reversing blades being as indicated by the arrow 64. Absolute discharge from the reversing blades is as indicated by arrow 66, imposing on the turbine blades 24 a direction of movement as indicated by arrow 68 and resulting in a relative inlet angle of flow to the turbine blades when the latter are turning at normal full speed which is substantially radial as indicated by arrow 70. With blades 24 turning in reverse direction, the relative inlet angle of flow to the pump blades from the turbine blades is as indicated by arrow 72.

From consideration of Figs. 2 and 3, it will be apparent that while the difference between the relative inlet angle of entrance to the turbine blades under normal operating conditions in forward and reverse is not greatly different, so that these blades, if of modified tear drop or airfoil profile, may be substantially straight without introducing material inlet losses regardless of their direction of rotation, the relative inlet angle of entrance to the pump blades in normal forward operation is very materially different from that in normal reverse operation. Consequently, it is desirable to provide inclined inlet or nose portions for the pump blades in order that entrance losses both in forward and reverse drive may be minimized.

Again referring to the diagram of Fig. 3, it is apparent that when the device operates in reverse, its character changes from that of a two-element device to a three-element device having driving and driven members and a reaction member, the latter being constituted by the guide blades. Thus, when operating in reverse, the device operates as and has the characteristics of a torque multiplying converter rather than the characteristics of a coupling and because of this fact, the rate of circulation in the hydraulic circuit becomes greater than when the device is operating as a coupling. If the circulation were as unrestricted as is the case when operating in forward drive as a coupling, the converter efficiency would be as indicated by curve 74 in Fig. 5, wherein efficiency is plotted against the ratio of relative speeds, or slip, between the pump and turbine members. Also, due to the rapid circulation rate in an unthrottled three-element circuit, the torque absorbing characteristic of the device would be substantially greater than its torque absorbing characteristic as a coupling and this would operate to overload the engine or other source of power input to the device, with resultant decrease in primary or power input speed. If that were permitted to occur, it would obviously be impossible to bring the maximum secondary speed to an acceptably high percentage of the normal input speed.

By restricting the circuit so as to reduce the rate of circulation obtainable with normal maximum primary speed, this characteristic of the three-element circuit can be modified so as to produce an efficiency characteristic of the kind indicated by curve 76, and at the same time the torque absorbing characteristic of the device will be reduced to a value such that normal maximum primary or input speed can be maintained throughout the major portion of the slip range. With the throttled circuit, therefore, it is possible to attain a secondary speed of the order of 80% of normal maximum primary speed before the efficiency of the device begins to fall off to an extent limiting the maximum secondary speed attainable under load.

In the present instance the desired throttling of the circuit when operating in reverse is obtained by use of reversing blades having very small outlet angles within the range of values previously noted. Such small outlet angles result in constricted outlet portions in the channels between the reversing blades, which introduce a resistance operating to limit the rate of circulation. This is accomplished, however, without introducing unnecessary losses occasioned by turbulence or other undesirable character of flow which would be introduced were the rate of circulation limited by means of baffles or other obstructions of like nature. Consequently, satisfactory efficiency is obtainable while operating in reverse and this, coupled with the relatively high maximum secondary speed obtainable, renders the device of practical utility for both forward and reverse operation.

It is important that when the device is operated in forward drive the reversing blade member be permitted to rotate freely, since even though this member is in its withdrawn position entirely outside of the flow circuit, the torque resistance due to drag if the reversing member is held rotationally stationary, is of an unexpectedly high value. For example, I have found by test that with a coupling having a normal torque transmitting capacity of about 350 foot pounds at about 3% slip, the drag torque created by a reversing member such as the one shown herein amounted to 90 foot pounds when the device was operating normally in forward drive. It is for this reason that it is necessary to the most efficient operation of the device that the reversing member be releasable to permit it to rotate freely when the device is in normal forward speed operation.

While for purposes of describing and illustrating the nature of the invention only one structural example has been shown, it will be apparent that the principles of the invention may be embodied in many different specific forms of apparatus. The invention is therefore to be considered as embracing all forms of apparatus coming within the scope of the appended claims.

What is claimed:
1. A hydraulic power transmitter of the closed circuit type comprising a primary member providing pump blades arranged to discharge fluid substantially radially and having cambered nose portions bent in the direction of pump rotation, a secondary member providing turbine blades arranged to discharge fluid substantially radially and a reversing member providing reversing guide blades, said reversing member being movable to shift said reversing blades from a position in the circuit between the outlet side of the pump blades and the inlet side of the turbine blades to a position outside of the circuit, said pump and turbine blades constituting the only blading in the circuit when said reversing blades are withdrawn therefrom.

2. A hydraulic power transmitter of the closed circuit type comprising a primary member providing pump blades, a secondary member providing turbine blades, said turbine blades being substantially radial throughout their length and shaped with streamline profiles providing thickened and bluntly rounded inlet edge portions, and a reversing member providing reversing guide blades, said guide blades being shaped to provide outlet angles not exceeding approximately 20°, said reversing member being movable to shift said reversing blades from a position in the circuit between the outlet side of the pump blades and the inlet side of the turbine blades to a position outside of the circuit, said pump and turbine blades constituting the only blading in the circuit when said reversing blades are withdrawn therefrom.

3. A hydraulic power transmitter of the closed circuit type comprising a primary member providing pump blades substantially radial throughout the major portion of their length and shaped to provide relatively blunt rounded nose portions cambered in the direction of pump rotation, a secondary member providing turbine blades, and a reversing member providing reversing guide blades, said reversing member being movable to shift said reversing blades from a position in the circuit between the outlet side of the pump blades and the inlet side of the turbine blades to a position outside of the circuit, said pump and turbine blades constituting the only blading in the circuit when said reversing blades are withdrawn therefrom.

4. A hydraulic power transmitter of the closed circuit type comprising a primary member providing pump blades substantially radial throughout the major portions of their lengths and having thickened and rounded inlet edge portions, a secondary member providing turbine blades substantially radial throughout the major portion of their lengths and having thickened and rounded inlet edge portions, and a reversing member providing reversing guide blades, said reversing guide blades being spaced and arranged to substantially throttle the rate of fluid flow in the circuit, said reversing member being movable to shift said reversing blades from a position in the circuit between the outlet side of the pump blades and the inlet side of the turbine blades to a position outside of the circuit, said pump and turbine blades constituting the only blading in the circuit when said reversing blades are withdrawn therefrom.

5. A hydraulic power transmitter of the closed circuit type comprising a primary member providing pump blades, said pump blades being substantially radial throughout the major portion of their lengths and having thickened and rounded inlet edge portions cambered in the direction of pump rotation, a secondary member providing turbine blades substantially radial throughout the major portions of their lengths and having thickened and rounded inlet edge portions, and a reversing member providing reversing guide blades, said reversing guide blades being spaced and arranged to substantially throttle the rate of fluid flow in the circuit, said reversing member being movable to shift said reversing blades from a position in the circuit between the outlet side of the pump blades and the inlet side of the turbine blades to a position outside of the circuit, said pump and turbine blades constituting the only blading in the circuit when said reversing blades are withdrawn therefrom.

ALF LYSHOLM.

REFERENCES CITED

The following references are of record in the file of this patent:

UNITED STATES PATENTS

| Number | Name | Date |
|---|---|---|
| 1,199,361 | Föttinger | Sept. 26, 1916 |
| 2,093,127 | Föttinger | Sept. 14, 1937 |
| 2,122,353 | Salerni | June 28, 1938 |
| 2,162,543 | Banner | June 13, 1939 |
| 2,186,025 | Jandasek | Jan. 9, 1940 |
| 2,255,430 | Lysholm | Sept. 9, 1941 |

FOREIGN PATENTS

| Number | Country | Date |
|---|---|---|
| 362,952 | Great Britain | Dec. 10, 1931 |